United States Patent Office 3,663,649
Patented May 16, 1972

3,663,649
THERMOPLASTIC OLEFINIC SILOXANE-ETHYLENE POLYMER BLOCK COPOLYMERS
Marshall L. Wheeler, Jr., Olean, N.Y., assignor to Union Carbide Corporation, New York, N.Y.
No Drawing. Continuation-in-part of application Ser. No. 422,037, Dec. 29, 1964, which is a continuation-in-part of application Ser. No. 356,944, Apr. 2, 1964. This application June 1, 1970, Ser. No. 42,494
Int. Cl. C08g 47/10; C08f 29/10
U.S. Cl. 260—827
10 Claims

ABSTRACT OF THE DISCLOSURE

This invention relates to thermoplastic siloxane-ethylene polymer block copolymers consisting essentially of at least one siloxane block consisting essentially of hydrocarbylsiloxane groups and at least one ethylene polymer block consisting essentially of ethylene groups, said hydrocarbyl groups being monovalent hydrocarbon groups free of aliphatic unsaturation, said ethylene polymer block being derived from a solid ethylene polymer having a molecular weight of at least 1800 and said siloxane block being linked to said ethylene polymer block by a silicon to carbon bond.

The block copolymers of this invention are useful as surfactants in olefin polymers (e.g., as additives to polyethylene to improve the anti-block and anti-slip properties thereof).

---

This application is a continuation-in-part of S.N. 422,-037, filed Dec. 29, 1964, now U.S. Pat. No. 3,573,334, granted Mar. 30, 1971, which in turn is a continuation-in-part of S.N. 356,944, filed Apr. 2, 1964, now abandoned.

Prior to this invention various derivatives have been produced by reacting organosilicon materials (silanes and siloxanes) with ethylene polymers. By way of illustration, silanes have been reacted with ethylene polymers to improve the adhesion of the ethylene polymers to inorganic substrates. As a further illustration, siloxanes have been reacted with ethylene polymers to modify the properties of the ethylene polymers. Such silane-ethylene polymer derivatives were substantially free of siloxane linkages and so had relatively little surface tension lowering ability when dissolved in olefin polymers and had oxidatives stability that was little better than that of the parent ethylene polymer. Certain of the known siloxane-ethylene polymer derivatives were highly crosslinked and so insoluble and not especially useful as surfactants. Other known siloxane-ethylene polymer derivatives were produced from ethylene polymers of relatively low molecular weight with the result that the derivatives were low melting. When these low melting derivatives are added to olefin polymers and the polymers are used to produce films, the derivatives tended to migrate to the surfaces of the films at temperatures slightly above ambient temperatures to form a grease-like film which exhibited an undesirable pseudo-blocking effect.

It is an object of this invention to provide novel organo-silicon-ethylene polymers that are useful as surfactants.

Other objects of this invention will be apparent from the following description thereof.

This invention provides thermoplastic siloxane-ethylene polymer block copolymers consisting essentially of at least one siloxane block consisting essentially of hydrocarbylsiloxane groups and at least one ethylene polymer block consisting essentially of ethylene groups (i.e.,

—CH$_2$CH$_2$— groups), said hydrocarbyl groups being monovalent hydrocarbon groups free of aliphatic unsaturation, said ethylene polymer block being derived from a solid ethylene polymer having a molecular weight of at least 1800 and said siloxane block being linked to said ethylene polymer block by a silicon to carbon bond.

The block copolymers of this invention can be produced by grafting a siloxane having at least one silicon-bonded olefinically unsaturated monovalent hydrocarbon group to an ethylene polymer to convert the olefinically unsaturated group to a divalent hydrocarbon group attached to a silicon atom of the siloxane block and to a carbon atom of the polyethylene block.

The siloxane reactants employed in producing the block copolymers of this invention by the grafting process include siloxanes consisting essentially of groups having the formula:

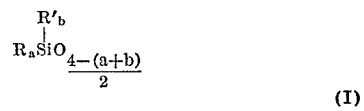

(I)

wherein R is an olefinically unsaturated monovalent hydrocarbon group, R′ is a monovalent hydrocarbon group free of aliphatic (olefinic or acetylenic) unsaturation, $a$ has a value from 1 to 3 inclusive (preferably 1), $b$ has a value from 0 to 2 inclusive, and $(a+b)$ has a value from 1 to 3 inclusive (preferably 2). The above-described siloxanes that are useful in this invention are substantially free of SiH groups.

Illustrative of the groups represented by R in Formula I are the alkenyl groups (e.g. the vinyl, allyl, methallyl, and butenyl groups), the cycloalkenyl groups (e.g. the cyclopentenyl and the cyclohexenyl groups) and the alkenyl-aryl groups (e.g. the vinyl phenyl groups, (CH$_2$=CHC$_6$H$_5$—)

Illustrative of the groups represented by R′ in Formula I are the alkyl groups (e.g. the methyl, ethyl, propyl, and butyl groups), the aryl groups (e.g. the phenyl and naphthyl groups), the aralkyl groups (e.g. the beta-phenylethyl groups) and the cycloalkyl groups (e.g. the cyclopentyl and cyclohexyl groups).

Useful siloxane reactants also include siloxanes consisting essentially of from 2 to 98 mole-percent (preferably from 10 to 40 mole percent) of groups represented by Formula I and from 2 to 98 mole percent (preferably from 60 to 90 mole percent) of groups having the formula:

(II)

wherein R′ has the meaning defined in Formula I and $c$ has a value from 1 to 3 inclusive (preferably 2).

Suitable siloxane reactants of the difunctional varieties which include cyclic and linear polysiloxanes, can be more specifically illustrated by the structural formula:

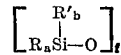

wherein $a$ is an integer having a value of from 1 to 2, $b$ has a value of 0 to 1, R and R′ represent the same groups as defined hereinbefore in Formula I; and wherein $f$ is an integer having a value of at least 3, and can be as high as 15 or even higher, for the cyclic hydrocarbylpolysiloxanes and higher for the linear hydrocarbylpolysiloxanes. Such cyclic and linear polysiloxanes can be prepared by the hydrolysis and condensation of hydrocarbyl(hydrocarbyl) dimethoxysilanes or di(hydrocarbyl)dimethoxysilanes. In carrying out the hydrolysis and condensation procedures there is produced a product comprising a mixture of cyclic and linear polysiloxanes from which the desired polysiloxane can be isolated and recovered. Illustrative of the cyclic polysiloxanes suitable for use in this invention are the cyclic tetramer of vinyl(propyl) siloxane and the like. Illustrative of linear polysiloxanes are 1-allyl(methyl)-polysiloxane, vinylbutylpolysiloxane, para-vinyl-phenyl-heptylpolysiloxane, di(butenyl)polysiloxane, and the like.

Included among the linear siloxane reactants which can be employed are the alkyl, methoxy, acetoxy or hydroxyl end-blocked polysiloxanes which contain from 1 to 3 of such groups bonded to the terminal silicon atoms of the molecules comprising the polymer chains. Thus there can also be employed as the starting hydrocarbylsilicon compound such linear end-blocked hydrocarbylpolysiloxanes as monoacyloxy end-blocked vinylpropylpolysiloxane or methyldimethoxysilyl end-blocked butenyl-methylpolysiloxane and the like. The end-blocked linear hydrocarbylpolysiloxanes useful in producing the novel block copolymer can be prepared by the equilibration of cyclic hydrocarbylpolysiloxanes with silicon compounds containing predominantly silicon-bonded X groups, or by cohydrolysis and condensation of trialkylmethoxysilanes with hydrocarbylalkoxysilanes. Hydroxyl end-blocked linear polysiloxanes can also be prepared by heating linear or cyclic hydrocarbylpolysiloxanes with water.

Although siloxane reactants containing methoxy and hydroxyl groups are in general operable, it is preferred that such groupings be present only in minor amounts to keep undesirable side reactions to a minimum. Siloxanes containing silanic hydrogen or free radical inhibiting substituents are especially to be avoided since the presence of such substituents can alter the course of the grafting reaction or prevent it from occurring. Trace amounts of such substituents are, of course, permissible. The siloxane blocks in the block copolymers of this invention corresponding to the above-described siloxane reactants wherein R in Formula I is a divalent hydrocarbon group linking the siloxane and polyethylene blocks.

The above siloxane reactants and the resulting siloxane blocks are preferably linear and have a hydrocarbon group [i.e. R' (or the divalent hydrocarbon group derived therefrom) +R] to silicon ratio of about 2:1.

The ethylene polymer reactants employed in producing the block copolymers of this invention by the grafting process include homopolymers of ethylene and copolymers of 75 to 99 weight percent polymerized ethylene and 1 to 25 weight percent of another polymerized olefinically unsaturated organic compound (e.g., alpha-olefins such as styrene, vinyl chloride, propylene, butylene, ethyl acrylate, bicycloheptene, vinyl acetate and the like). The ethylene polymer can be free of olefinic unsaturation or can contain some olefinic unsaturation (e.g., up to about one olefinic double bond per molecule or more). The ethylene polymer reactant can be unmodified or can contain modifying groups such as COOH, COOalkyl, phosphite, ether or OH groups and the like. The ethylene polymer preferably has a molecular weight from 1800 to 40,000. Ethylene polymer suitable for use in producing the block copolymers of this invention is disclosed in U.S. Pats. 2,766,214; 3,144,348; 2,921,920; 2,766,214; 2,342,400; 2,542,783; 2,592,526; and 2,703,794.

The siloxane and ethylene polymer reactants that are suitable for use in producing the block copolymers of this invention are non-crosslinked materials. That is they are not thermoset solids or gels but can, of course, have a certain amount of branching. Included are both liquid siloxanes (including those that are capable of further polymerization to form solid thermoplastic or thermoset polymers) and thermoplastic solid siloxanes and solid ethylene polymers.

A free radical generator is used as a catalyst in preparing the graft copolymers of this invention by the grafting process. The preferred free radical generators which are used in this invention are organic peroxides. Illustrative of the organic peroxides which can be employed are hydroperoxides such as t-butyl hydroperoxide, cumene hydroperoxide, tetralin hydroperoxide, and tri- phenylmethylhydroperoxide, peroxy acids such as peroxy acetic acid, peroxybenzoic acid, monoperoxyphthalic acid, diperoxyphthalic acid, and 2,4-dichloroperoxybenzoic acid; diorganoperoxides such as ditertiary butyl peroxide, ascaridol, benzoyl peroxide, 2,4-dichlorobenzoyl peroxide, t-butyl perbenzoate, diacetyl peroxide, dicumyl peroxide, di-t-butyldiperoxyphthalate, $(Me_3COO)_2CMe_2$, and the like. Diorganic peroxides, as for example di-tertiary butyl peroxide are preferred catalysts for the grafting reaction. The amount of the organic peroxide catalyst employed is not critical although catalyst concentrations from .1%–10% by weight based on the weights of the reactants can be used advantageously. The amount of catalyst generally preferred ranges from 1.0–5% by weight of the reactants.

The temperature at which the reaction is carried out to produce the graft copolymers of this invention will depend on the free radical inducing chemical compound (organic peroxide) employed and should be high enough to cause formation of free radicals in the reaction mixture. Suitable temperatures range from 30–225° C. with 80–200° C. being the preferred range.

Often, the siloxane reactant is not miscible with the ethylene polymer reactant and difficulties arise in reacting these materials unless a suitable solvent is used, such as, for example, diphenyl ether, toluene or xylene. The reaction temperature is, therefore, limited by the reflux temperature of the solution and a higher boiling solvent will permit a higher temperature. The type of solvent is critical only insofar as the starting materials must be mutually soluble therein and the solvent must be relatively inert to free radical attack. It is also necessary that the amount of solvent be sufficient to provide a homogeneous solution of the starting materials at the reaction temperature. While the grafting reaction can be carried out at subatmospheric or superatmospheric pressure there is usually no advantage to doing so.

The relative amounts of the siloxane and ethylene polymer reactants used in preparing the graft copolymers of this invention depends to a large extent upon the number and reactivity of the olefinic substituents in the siloxane as well as the weight percent of siloxane desired in the copolymer. When the siloxane contains an average of only one olefinic substituent, the ratio of siloxane reactant to ethylene polymer reactant can vary over an almost unlimited range being controlled chiefly by practical considerations. Usually the preferred amount of siloxane in the copolymer is from 5 to 95 percent by weight based on the total graft copolymer used since small amounts do not normally give graft copolymers with widely useful properties.

A surprising feature of the present invention is that siloxane reactants containing a multiplicity of olefinic substituents can be grafted to ethylene polymer without the formation of cross-linked gels. While a broad range of copolymer compositions can be prepared from such materials it is generally preferred to use a reactant ratio which will give 5 to 50 percent by weight of siloxane in the copolymer. When copolymers containing higher percentages of siloxane are desired these are readily obtained by fractionation of the grafted copolymer with a suitable solvent to remove copolymer compositions low in siloxane. Solvent fractionation procedures are also useful in removing ungrafted ethylene polymer from the copolymer particularly when the ethylene polymer is of low molecular weight. Formation of crosslinked gels can be prevented if the mole ratio of monomeric units in the ethylene polymer to olefinic substituents in the siloxane polymer is greater than eight to one during the grafting process. Gelation in the copolymer can also be minimized by slowly adding small amounts of an admixture of the siloxane and free radical catalyst (e.g., dropwise) to a heated (e.g. refluxing) solution of the ethylene polymer. When gelation occurs it is not extensive, especially if the above precautions are taken. The gelled (crosslinked) graft copolymers can be readily separated from the desired non-crosslinked graft copolymers by selectively dissolving the latter in suitable solvents.

The block copolymers of this invention can also be prepared by an addition process which involves reacting a hydrogen-siloxane with an ethylene polymer containing olefinic unsaturation in the presence of a platinum catalyst [e.g., chloroplatinic acid or $(C_6H_5CN)_2PtCl_2$]. The siloxane reactants useful in the addition process are similar to those used in the grafting process but the former have reactive SiH groups rather than reactive Si-olefin groups. Thus such reactants contain groups that can be represented by above Formula I wherein R is hydrogen and the other symbols are as defined above. The ethylene polymer reactants employed in the addition process are similar to those employed in the grafting process but the former must have olefinic unsaturation (preferably only one olefinic double bond and that double bond located in a terminal position).

In the grafting process, the R group in Formula I is converted to divalent hydrocarbon groups linking the siloxane block to the ethylene polymer block while in the addition process the SiR group in Formula I [now an SiH group] adds to a double bond of the ethylene polymer and so that the R is replaced by a valence of the silicon atom linking the silicon atom to a carbon atom of the ethylene polymer. Hence the siloxane blocks produced by such processes contain a group represented by Formula I wherein R' is a divalent hydrocarbon group or a valence of silicon.

A preferred class of siloxane reactants and siloxane blocks is represented by the average formula:

$$R_3SiO(R_2SiO)_x(RSiR'O)_ySiR_3$$

wherein R is as defined above, R' is an olefinically unsaturated monovalent hydrocarbon group (for a reactant in the grafting process), or hydrogen atom (for a reactant in the addition process), or a divalent hydrocarbon group (for a siloxane block resulting from the grafting process) or a valence of silicon (for a siloxane block resulting from the addition process), $x$ has a value from 0 to 100 inclusive and $y$ has a value from 3 to 6 inclusive.

The block copolymers of this invention are useful as rubber lubricants, particularly for tire molds, lubricants for metal-to-metal moving surfaces and textile lubricants. In addition, the copolymers of this invention are particularly useful as surfactants, for example, additives to thermoplastic organic polymers such as olefin polymers (particularly the ethylene polymers as described above as reactants in an amount of from 0.1 to 5 parts by weight per 100 parts by weight of the ethylene polymer) to reduce the surface tension and to improve the slip, levelling, anti-block and other properties thereof, especially at elevated temperatures. The surfactant properties of the copolymers of this invention are due to the chemical moieties therein and to their thermoplastic structures. The noncrosslinked nature of the graft copolymers is evidenced by the fact that they melt (e.g., they have melting points of at least 121° C.) and that they are soluble in solvents such as aromatic hydrocarbons (e.g., benzene, toluene, xylene, etc.) and aromatic ethers (e.g., diphenyl ether).

The term "block copolymer" is used herein in a generic sense to denote copolymers of the AB and ABA types as well as ("graft") copolymers wherein one block(s) is (are) pendant from a non-terminal site on the other block.

The following examples illustrate the present invention:

In the following examples, "Lites" denoes volatile materials, "desolvate" denotes removal of volatile materials by volatilization, "Me" denotes a methyl group, "Vi" denotes a vinyl group and "percent" denotes percent by weight. In each example, the reaction mixture was a homogeneous solution and the copolymer products were non-crosslinked as shown by their solubilities and/or melting points.

EXAMPLE I

A vinylsiloxane was produced by equilibrating a mixture of 280 grams of $Me_3SiO(SiMeViO)_3SiMe_3$ and 720 grams of $(Me_2SiO)_4$ employing 100 parts by weight of potassium per million parts by weight of the siloxane as a catalyst. The lites-free product was a clear, water white siloxane that has a viscosity of 22.8 cst. The siloxane had the average formula:

To a 500 ml., 3-neck, round-bottom flask, fitted with a heating mantle, thermometer, Dean-Stark trap, reflux condenser, agitator, a dropping funnel and an inert gas guard was charged 100 grams of diphenyl ether and 50 gms. of low density polyethylene wax. The polyethylene wax had a ring softening temperature of 111° C. and a molecular weight of 2,500. The flask contents were heated to 170–190° C. and the following mixture added dropwise in one hour. 100 gms. of diphenylether, 20 gms. of reagent grade toluene, 12 gms. of the vinylsiloxane described above and 0.5 gms. of ditertiary butyl peroxide. The flask remained clear and homogeneous during the addition. A portion of the crude graft copolymer was desolvated in a Cal Lab Roto Film evaporator at 1 mm. Hg and an oil bath temperature of 220° C. The desolvated crude graft copolymer analyzed 6.6% silicon and was a uniform solid. A mixture of reactants incompatible and, if cooled after heated to the melting point of the polyethylene was formed a dispersion of polyethylene particles in the siloxane. The desolvated graft copolymer readily dissolved in hot xylene. A portion of the graft copolymer was heated in one gallon of toluene to form a solution and then cooled. The graft copolymer rich in silicone and the unreacted siloxane remained in the toluene and the graft copolymer low in siloxane content and the ungrafted polyethylene precipitated from solution. The precipitated material was filtered free of the toluene, etc. then desolvated. The desolvated graft copolymer contained 4.1% silicon (10.8% siloxane).

EXAMPLE II

A vinylsiloxane was produced by equilibrating a mixture of 140 grams of $Me_3SiO(SiMeViO)_3SiMe_3$ and 360 grams of $(Me_2SiO)_4$ with 1150 parts by weight of potassium hydroxide per million parts by weight of the siloxane as a catalyst. After removal of volatile materials, the product was a water-white hazeless siloxane fluid having a viscosity of 19.4 cst. This siloxane has the average formula:

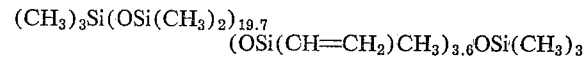

To a 500 ml. 3-neck flask fitted as described in Example I were charged 200 grams of diphenylether, 100 grams of xylene and 50 grams of a maleic anhydride-modified polyethylene wax which has a molecular weight of about 2000 and the average formula:

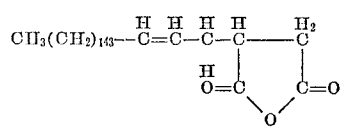

about one-half of the wax is as represented by the above formula, one fourth has succinic anhydride at both ends of the linear chain and, one-fourth is non-functional (i.e., free of succinic anhydride residues). The contents of the flask were heated to 175° C. removing the xylene and other volatile materials that boiled up into the Dean- Stark trap. The following mixture was added dropwise to the flask maintained at 175° C. in one hour; 15 grams of the above-described vinylsiloxane fluid, and 0.67 grams of ditertiary butyl peroxide. The flask contents were clear and hazeless indicating homogeneity throughout the addition. The product was added hot to 4 parts of analytical grade of xylene at 130° C. The homogeneous solution was cooled to room temperature to precipitate the grafted product relatively poor in siloxane content and the ungrafted polyethylene. The graft copolymer rich in siloxane and any ungrafted siloxane fluid remained in solution. The precipitated solids were filtered free of the solvent and desolvated as described in Example I above. The recovered graft copolymer analyzed 2.2% silicon indicating a siloxane content of 5.8%. The graft copolymer product redissolved easily in hot xylene.

EXAMPLE III

A vinylsiloxane was produced by equilibrating a mixture of 118.3 grams of $(CH_3)_3SiO(CH_3)_2SiOSi(CH_3)_3$, 129.3 grams of cyclic siloxanes composed of $$CH_3Si(CH=CH_2)O$$

groups and 148.3 grams of $[(CH_3)_2SiO]_4$ employing 100 parts by weight of potassium per million parts by weight of the siloxanes as a catalyst. The product was a clear, water white siloxane that had a viscosity of 18 cst. The siloxane had the average formula:

$(CH_3)_3Si[OSi(CH_3)_2]_{17}$
$[OSi(CH=CH_2)CH_3]_3OSi(CH_3)_3$

A polyethylene wax having an average of about one olefinic double bond per molecule, a molecular weight of approximately 1,800 and a melting point of 121° C. was reacted with the vinylsiloxane produced as described above as follows:

To a 500 ml. 3-neck flask fitted with a mantle, thermometer, Dean-Stark trap, reflux condenser, agitator and an inert gas guard was charged 100 grams of the wax and 100 grams of xylene. This mixture was heated to 180° C., removing 66.8 grams of xylene, then cooled to 175° C. A mixture of 33 grams of vinylsiloxane produced as described above and 3.3 grams of di-tertiary butyl peroxide was added dropwise to the flask. The first drops of siloxane caused the contents to the flask to become hazy due to immiscibility. To achieve a homogeneous mixture, the xylene removed was returned to the flask and 100 grams of o-terphenyl were added to the flask. The flask temperature was thus lowered to 165° C. and the siloxane was added in 45 minutes. After volatilization of the solvent at 260° C. and 800 microns of mercury pressure, 132 grams of crude graft copolymer was recovered which contained 7.5 wt. percent Si. A sample of this product, heated in a vial at 140° C. overnight, did not separate into two layers. The melting point of the polyethylene was uneffected by the grafting (it was still 121° C.). Twenty grams of the grafted materials were dissolved in hot xylene and added to 2000 grams of refluxing n-heptane. A precipitate formed (purified graft copolymer). After removal of the heptane, the copolymer was found to contain 6.5 wt. percent Si.

EXAMPLE IV

Following the general procedure of Example III, a block copolymer of this invention of the graft variety was produced from 100 grams of the polyethylene wax described in Example III and 33.3 grams of an equilibrated siloxane liquid having the average formula:

$$Me_3SiO(Me_2SiO)_{15}(MeSiViO)_3SiMe_3$$

Diphenyl ether was used as a solvent in place of the o-terphenyl of Example III. The block copolymer so produced was soluble in hot toluene and had a melting point of 110° C. This block copolymer is referred to hereinafter as "Copolymer I."

EXAMPLE V

This example illustrates the production of block copolymer of this invention by the addition process. This block copolymer is referred to hereinafter as "Copolymer II."

To a one liter, three neck flask fitted with a heating mantle, an agitator, a Dean-Stark trap, a reflux condenser, an inert gas guard and thermometer were added 400 grams of reagent grade xylene and 700 grams of polyethylene containing one —CH=CH$_2$ group per molecule having a melt index of about 1500, containing 0.74 wt. percent —CH=CH$_2$. The mixture so formed was dehydrated by heating at reflux and removing 20 cubic centimeters of xylene azeotrope through the Dean-Stark trap. Then there were added to the flask 34.3 grams of a hydrogensiloxane having the average formula:

$$Me_3SiO(Me_2SiO)_{40}(Mo\overset{H}{\underset{|}{Si}}O)_{3.2}SiMe_3$$

Another 20 grams of liquid was removed through the Dean-Stark trap while heating the contents of the flask at reflux. While maintaining the contents of the flask at reflux, 0.0479 gram of $(C_6H_5CN)_2PtCl_2$ was added to the flask (100 parts elemental platinum per million parts by weight of the polyethylene and the siloxanes). The contents of the flask were again heated at reflux for 0.5 hour. The xylene was then distilled from the flask and the residue ("Copolymer II") was a solid having a melting point of 125° C. containing 0.32 cubic centimeters of H$_2$ per gram and containing 10.0±0.5 wt. percent Si. Copolymer II had the average formula:

$$Me_3SiO(Me_2SiO)_{40}(Me\overset{Z}{\underset{|}{Si}}O)_{3.2}SiMe_3$$

wherein Z is the polyethylene block:

$$-CH_2CH_2(CH_2)_{257}CH_3$$

EXAMPLE VI

Copolymers I and II were tested as surfactants as described below.

Copolymers I and II were mixed with polyethylene having a molecular weight of 12,000 and the mixture was melted at 130° C. The following properties of the molten mixtures were measured. For purposes of comparison, the same measurements were made in the polyethylene having no surfactant and on the polyethylene containing a conventional siloxane-polyoxyalkylene block copolymer surfactant. The latter surfactant is referred to hereinafter as "Copolymer A."

TABLE I

| Surfactant | Part by weight [1] | Surface tension [2] | Extensibility [3] | Solubility |
|---|---|---|---|---|
| None | 0 | 31.8 | 1.00 | |
| Copolymer: | | | | |
| I | 1.0 | 22.9 | 0.76 | Partly. |
| I | 0.1 | 24.6 | 3.8 | Soluble. |
| II | 1.0 | 21.2 | 6.3 | Do. |
| II | 0.1 | 27.3 | 1.2 | Do. |
| A | 1.0 | 25.1 | 3.75 | Do. |
| A | 0.1 | | 0.5 | Do. |

[1] Per 100 parts by weight of the polyethylene.
[2] Dynes per centimeter at 130° C.
[3] Ratio of length of film that can be drawn from the polyethylene with surfactant to length without surfactant.

Copolymers I and II and, for purposes of comparison, other surfactants were tested in polyethylene (12,000 mol. wt.) as anti-slip agents (materials which reduce the coefficient of friction) and as anti-blocking agents (materials which reduce tendency of polyethylene films to fuse). The surfactants were blended with the polyethylene (0.5 part by weight of surfactant per 100 parts by weight of the polyethylene). The tests were conducted on films made from the mixture. Prior to the anti-blocking test, the films were subjected to corona treatment. The results are shown in Table II below:

TABLE II

| Surfactant | Slip agent | Anti-blocking agent |
|---|---|---|
| Erucamide | Yes | No |
| Copolymer: | | |
| A | No [1] | Yes |
| I | Yes | Yes [2] |

[1] Coefficient of friction was increased.
[2] Film has no haze and can be printed.

As will be apparent to those skilled in the art siloxane and ethylene polymer reactants used in the above examples are mixtures of compounds differing from one another in the number of monomeric units in the molecule and, where the reactant contains more than one type monomeric unit, in the relative amounts of the monomeric units. Accordingly, it is also apparent that the resulting block copolymer will also be a mixture of compounds differing from one another in these respects. Another difference between the individual block copolymer species is the relative amounts of the siloxane and ethylene moieties therein. Further, the copolymer usually contains small amounts of unreacted siloxane and ethylene polymers and crosslinked copolymers, the amounts of which materials can be reduced even further by the separation procedures outlined above.

What is claimed is:

1. A blend consisting essentially of an ethylene polymer and from 0.1 to 5 parts by weight per 100 parts by weight of the ethylene polymer of a thermoplastic siloxane-ethylene polymer block copolymer of the graft variety consisting essentially of a linear siloxane block consisting essentially of hydrocarbylsiloxane groups endblocked by alkyl, methoxy, acetoxy or hydroxyl groups and at least one pendant ethylene polymer block consisting essentially of ethylene groups, said hydrocarbyl groups being monovalent hydrocarbon groups free of aliphatic unsaturation, said ethylene polymer blocks being derived from a solid ethylene polymer having a molecular weight of at least 1800 and said siloxane block being linked to each said ethylene polymer block by a silicon to carbon bond, the silicon atom in said bond being a non-terminal silicon atom in the siloxane block.

2. A blend as claimed in claim 1 wherein the block copolymer has a melting point of at least 121° C. and consists essentially of (a) at least one siloxane block having the formula:

$$R_3SiO(R_2SiO)_x(RSiR''O)_ySiR_3$$

wherein R is said hydrocarbyl group, R'' is a divalent hydrocarbon group linking this siloxane block to a carbon atom of the ethylene polymer block, x has a value from 0 to 100 inclusive and y has a value from 3 to 6 inclusive, and (b) at least three ethylene polymer blocks each derived from an ethylene polymer having a molecular weight of at least 1800.

3. A process for producing a block copolymer of the graft variety which process comprises heating at a reaction temperature of 80 to 200° C. homogeneous solution of a siloxane liquid containing at least one silicon-bonded olefinically unsaturated monovalent hydrocarbon group and free of SiH and a thermoplastic ethylene polymer having a molecular weight of at least 1800 in the presence of a peroxide catalyst to cause the siloxane to graft to the ethylene polymer to produce the block copolymer, said solution being formed by slowly adding an admixture of the siloxane and the peroxide to a solution of the ethylene polymer dissolved in a solvent for the siloxane and the ethylene polymer, which solution is maintained at the reaction temperature during the addition of the admixture and said block copolymer being a thermoplastic siloxane-ethylene polymer block copolymer consisting essentially of at least one siloxane block consisting essentially of hydrocarbylsiloxane groups and at least one ethylene polymer block consisting essentially of ethylene groups, said hydrocarbyl groups being monovalent hydrocarbon groups free of aliphatic unsaturation, said ethylene polymer block being derived from said solid ethylene polymer having a molecular weight of at least 1800 and said siloxane block being linked to said ethylene polymer block by a silicon to carbon bond.

4. A process as claimed in claim 3 wherein the block copolymer has a melting point of at least 121° C. and consists essentially of (a) at least one siloxane block having the formula:

$$R_3SiO(R_2SiO)_x(RSiR''O)_ySiR_3$$

wherein R is said hydrocarbyl group, R'' is a divalent hydrocarbon group linking this siloxane block to a carbon atom of the ethylene polymer block, x has a value from 0 to 100 inclusive and y has a value from 3 to 6 inclusive, and (b) at least three ethylene polymer blocks each derived from an ethylene polymer having a molecular weight of at least 1800.

5. A process as claimed in claim 3 wherein the mole ratio of monomeric ethylene units in the ethylene polymer to olefinic substituents in the siloxane polymer is greater than 8 to 1.

6. A process as defined in claim 3 wherein the ratio of hydrocarbyl groups to silicon atom in the siloxane block is about 2 to 1.

7. A process as defined in claim 3 wherein the ethylene polymer consists of ethylene groups.

8. A process as defined in claim 3 wherein the siloxane block has the formula:

$$R_3SiO(R_2SiO)_x(RSiR''O)_ySiR_3$$

wherein R is said hydrocarbyl group, R'' is a divalent hydrocarbon group linking the siloxane block to a carbon atom of the ethylene polymer block, x has a value from 0 to 100 inclusive and y has a value from 3 to 6 inclusive.

9. A process as defined in claim 8 wherein R is a methyl group and R'' is an alkylene group.

10. A process as defined in claim 8 wherein the ethylene polymer block is derived from an ethylene polymer having no more than one olefinic double bond.

References Cited

UNITED STATES PATENTS

| 2,716,128 | 8/1955 | West | 260—827 |
| 3,573,334 | 3/1971 | Wheeler | 260—827 |

FOREIGN PATENTS

| 860,327 | 2/1961 | Great Britain | 260—827 |
| 940,190 | 10/1963 | Great Britain | 260—827 |

OTHER REFERENCES

Campbell, German application 1,085,670, printed July 21, 1960.

Kendrick et al., German application 1,915,789, printed Oct. 9, 1969.

SAMUEL H. BLECH, Primary Examiner

U.S. Cl. X.R.

252—49.6, 351; 260—33.2 SB, 33.6 SB

UNITED STATES PATENT OFFICE
CERTIFICATE OF CORRECTION

Patent No. 3,663,649          Dated May 16, 1972

Inventor(s) M. L. Wheeler, Jr.

It is certified that error appears in the above-identified patent and that said Letters Patent are hereby corrected as shown below:

Col. 5, line 69, after "Lites", "denoes" should be "denotes".

Col. 6, line 9, after "22.8", "cst." should be "cstks".

Col. 6, line 52, after "19.4", "cst." should be "cstks".

Col. 7, line 27, after "18", "cst." should be "cstks".

Col. 8, line 20, the terminal portion of the formula should read "SiMe$_3$".

Col. 9, line 14, after "used", "inthe" should be "in the".

Signed and Sealed this twenty-seventh Day of April 1976

[SEAL]

Attest:

RUTH C. MASON
*Attesting Officer*

C. MARSHALL DANN
*Commissioner of Patents and Trademarks*